No. 692,325. Patented Feb. 4, 1902.
C. A. MAYNARD.
RUBBER TIRE.
(Application filed Dec. 3, 1900.)
(No Model.)
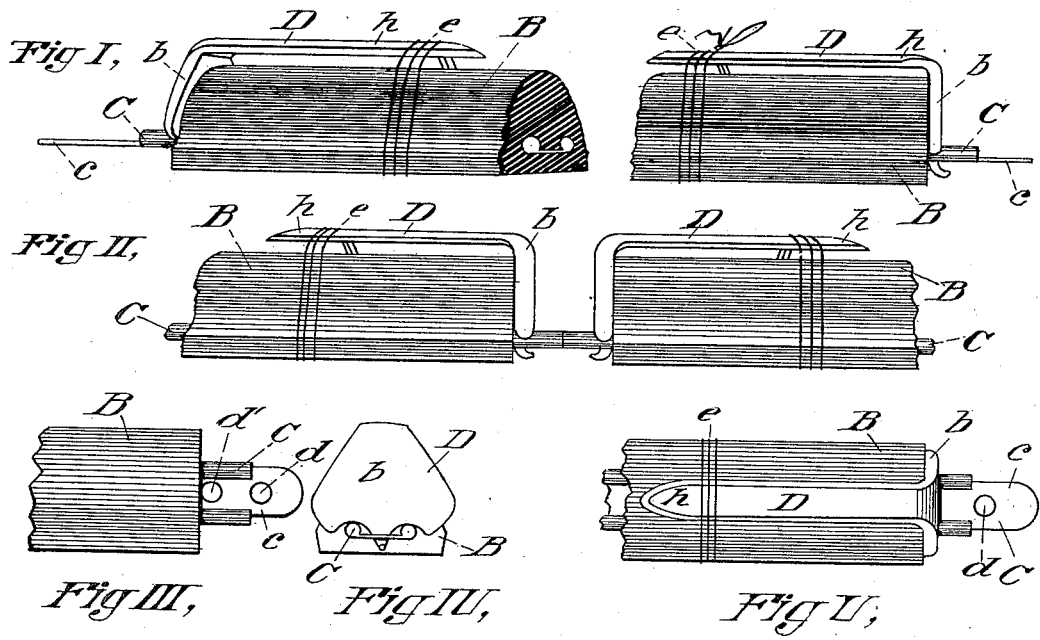
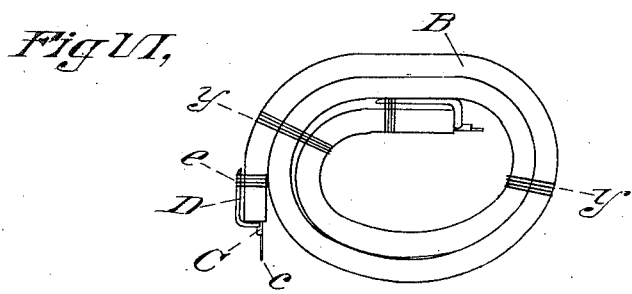
Witnesses,
J. S. O'Brien.
H. S. Collumns.
Inventor,
Charles A. Maynard
by his Attorney
R. O. Hyde

UNITED STATES PATENT OFFICE.

CHARLES A. MAYNARD, OF SPRINGFIELD, MASSACHUSETTS.

RUBBER TIRE.

SPECIFICATION forming part of Letters Patent No. 692,325, dated February 4, 1902.

Application filed December 3, 1900. Serial No. 38,405. (No model.)

*To all whom it may concern:*

Be it known that I, CHARLES A. MAYNARD, a citizen of the United States, residing at 127 Lebanon street, Springfield, county of Hampden, State of Massachusetts, have invented certain new and useful Improvements in Rubber Tires, of which the following is a specification.

My improvements relate to a new article of manufacture comprised in a rubber tire adapted to be combined with a vehicle-wheel without the intervention of the special machinery or appliances heretofore needed for that purpose and adapted for ready transportation in compact form, the object of the invention being to enable numbers of rubber-tire-vehicle owners now dependent upon the factory to replace worn-out or inefficient tires, with all of the expense and delay of sending their vehicle or detached wheel to a distant point, to without special tools place a new tire upon a wheel and obtain without delay and at small expense for transportation the required tire.

The invention consists in the combination and arrangement, as hereinafter described, and more particularly pointed out in the claim.

My invention is fully illustrated in the accompanying drawings, in which—

Figure I is a side elevation of a tire broken away in the center to show opposite ends. Fig. II is a side elevation of a tire broken away to show the ends where joined. Fig. III is a top plan view of one end of a tire incomplete. Fig. IV is an end elevation of one end of a tire. Fig. V is a top plan view of one end of a tire; and Fig. VI is a top plan view, in reduced scale, of a complete tire in form for transportation.

My improvements are particularly applicable to a tire of the construction shown by me in my patent of April 12, 1898, No. 602,346, in which a retaining-band consisting of cylindrical edges united by a web is employed, as the tire so constructed can be bent into a volute and held in that shape by cords, as shown in Fig. VI, having only to restrain it from expanding in the plane in which it was curved to form the volute, whereas with retainers in the form of one or more wires or of a plain flat band it is impossible to bend the tire so that the folds or plies will remain in the same plane, so that such a tire has to be transported in the form of a bar and curved in rolls just as it is being applied to the channel of the wheel; but there are many vehicles in need of new tires far removed from where bending-rolls are available, and to provide a tire which may be shipped from the factory directly to the owner of the vehicle needing it, to be by him applied to the wheel without rolls or the other special tools now in use, I construct a tire as follows:

B is the rubber tire, provided with the retaining-band C, arranged therein, as shown, near the bottom of the tire and comprising cylindrical edges united by a web, the edges being located upon each side of the vertical center of the tire, and terminal tongues $c$, adapted to overlap to form a joint and provided with rivet-holes $d$ and with a hole $d'$ adjacent to the end walls of the rubber for a purpose hereinafter described. The tire, as shown in Figs. I, II, and VI, has the rubber compressed from each end longitudinally toward the center of the tire to leave projecting at the two ends of the tire only the tongues to form the joint and to be completely covered by the now compressed tire when free to expand. The tire so compressed is held in that position by two specially-constructed clamps D D. Each clamp comprises a flat end $b$, adapted to coincide with and bear against the flat end of the tire above the retaining-band, a spur upon its bottom edge adapted to pass through and engage with the hole $d'$ in the retaining-band, shoulders upon each side of the spur adapted to seat the end $b$ firmly upon the retaining-band upon each edge, and a lever-arm $h$ approximately at right angles to the end $b$ and adapted to extend back over the top of the tire, as shown. The hole $d'$, as shown in Fig. III, is located in the band C immediately at the wall of the tire end, so that when the spur of the clamp is passed through said hole to hook in the band and the lever-arm $h$ is brought over the top of the tire the end $b$ is brought against the end of the tire to hold it compressed, and a slight retaining cord or wire $e$, as shown, is sufficient when wound around the lever-handle and tire to hold them together. The tire, when compressed from its ends, with its ends secured, as shown, is rolled upon its bottom side to assume a volute form, as seen in Fig. VI, in which form it is easily held by a few turns of a cord $y$ and is, in the shape of a bundle, conveniently shipped with the minimum danger of injury in transportation. When the volute is released, the tire has received the circular shape, entirely dispensing with the heretofore necessary rolls, adapting it to be combined with its seat in the channel of the wheel, so that to secure it in place it is only required to seat it in the wheel-channel, rivet the tongue ends, and remove the clamps D D to permit the tire to expand to have its ends abut to cover the joint. By the construction of clamps D D only a thin wall of metal on the ends of the tire projects beyond the ends to take up room, so that the ends may be approached to form the joint to leave only room, as shown in Fig. II, for the riveting-hammer to operate between them, which is a great advantage in leaving a smaller gap for the expansion of the tire to cover and also in requiring less compression to be given the tire in the start.

The advantage in a tire of this construction is that whereas in all others now in use special appliances are needed to make the union of the joint ends upon the wheel-channel, in this none are.

Now, having described my invention, what I claim is—

The combination with a rubber tire and retaining band or core extending through the tire, of a clamp for retaining the tire compressed from the terminal end of the core, and comprising an end wall adapted to conform to and bear against the tire end above the core, a spur upon the bottom of said wall adapted to hook into and engage the core; and a lever-arm from the top of said wall bent at approximately right angles thereto and extending back over the tire, and means for securing the lever-arm to the tire, all as set forth.

CHARLES A. MAYNARD.

Witnesses:
R. F. HYDE,
H. S. CULLUMNS.